July 8, 1969 R. A. WOLFF 3,454,721

TRANSISTORIZED AGC SYSTEM

Filed May 31, 1966

INVENTOR.
Robert A. Wolff
BY Nicholas A. Camasto
ATTY.

United States Patent Office 3,454,721
Patented July 8, 1969

3,454,721

TRANSISTORIZED AGC SYSTEM

Robert A. Wolff, Lombard, Ill., assignor to Admiral Corporation, Chicago, Ill., a corporation of Delaware Filed May 31, 1966, Ser. No. 554,020
Int. Cl. H04n 5/44, 5/52; H04b 1/16
U.S. Cl. 178—7.5 8 Claims

ABSTRACT OF THE DISCLOSURE

A gain control circuit for the tuner and IF stages of a television receiver incorporating a pair of voltage dividers and diodes for establishing levels such that over a first range of signal levels all gain reduction occurs in the IF stages, and over a second distinct range of signal levels all gain reduction occurs in the tuner.

This invention concerns Automatic Gain Control (AGC) systems for transistorized television receivers.

It is well known in the television art that some form of gain control is required due to the wide variation in signal level to which the receiver is subject. This art is highly developed with respect to television receivers utilizing vacuum tubes, and a good deal of the teachings thereof may be utilized in transistor receivers.

The invention discloses a novel AGC system for a transistorized television receiver which fulfills, with a minimum of parts and complicated circuitry, all requirements of an effective AGC system. As is well known, with transistors two types of gain control may be utilized, namely, reverse AGC and forward AGC. The circuit of the invention uses the latter type, and gain control is achieved by driving the transistors more heavily into conduction.

Accordingly, a primary object of this invention is to provide a novel AGC system for a transistorized television receiver.

A further object of this invention is to provide an economical AGC system for a transistorized television receiver which effectively minimizes tuner operation in the tuner noise and mixer overload areas.

Further objects and advantages of this invention will become apparent by reading the following specification in conjunction with the drawings in which:

FIG. 1 represents a block diagram of a conventional television receiver;

FIG. 2 displays curves of tuner and IF amplifier gain vs. bias for normal transistorized stages;

FIG. 3 displays idealized curves of tuner and IF AGC voltages obtainable with the invention as a function of input signal level;

Figure 1:
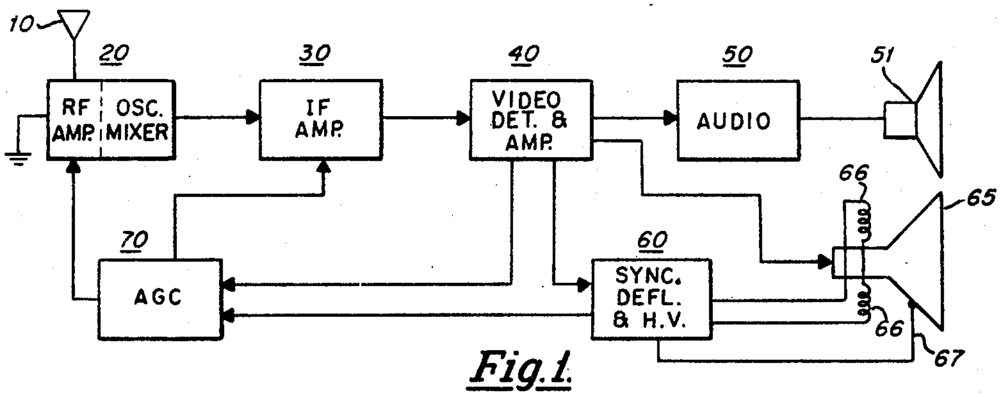

Referring now to FIG. 1, there is shown an antenna 10 coupled to a tuner 20 having a conventional RF amplifier and oscillator-mixer section. Tuner 20 operates in a normal manner to selectively receive and amplify television signals, and further to heterodyne the received signal with a locally generated oscillatory signal to produce an intermediate frequency signal which is coupled to an IF amplifier 30. The output of IF amplifier 30 is coupled to a video detector and amplifier 40, where the intermediate frequency carrier is removed and the modulation components are recovered. Video detector 40 has a number of outputs, one of which feeds an audio circuit 50 where the audio accompaniment of the transmitted television signal is recovered, amplified and utilized to drive a suitable loudspeaker 51. A second output connects to the input circuit of a picture tube 65, wherein it is used to modulate the electron beam intensity in accordance with the video information to produce a "picture" on the picture tube screen. A third output feeds a circuit 60 which incorporates: a synchronizing signal separator; a deflection system coupled to deflection coils 66 for scanning the electron beam over the screen of picture tube 65; and a high voltage development system, also coupled to picture tube 65 over a lead 67, for supplying the high voltage necessary for operation of the picture tube. The fourth output is connected to an AGC circuit 70, where circuitry is provided for developing control potentials as a function of the received television signal magnitude. The AGC circuit is of the keyed or gated variety, as indicated by the connection from block 60 to block 70. In accordance with well-known principles, the AGC circuit is activated only during occurrence of the synchronizing signal portions of the television signal to preclude AGC potential being developed as a function of video content. The AGC circuit in turn feeds tuner 20 and IF amplifier 30.

Figures 2, 3, 4:
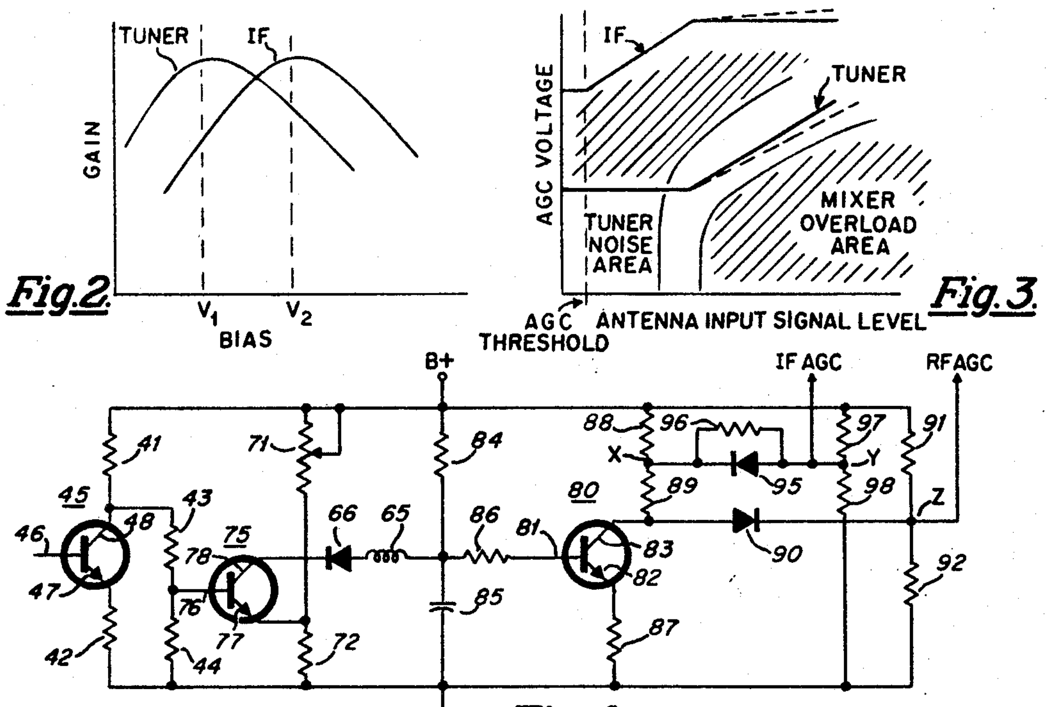
FIG. 4 is a schematic diagram of the portion of the circuit of FIG. 1 including the invention.

In FIG. 2, a pair of curves are shown indicating tuner and IF gain characteristics as a function of bias potential. It will be noted that both curves exhibit similar characteristics, namely, the gain is maximum for a particular bias voltage and diminishes for greater or lesser bias voltages. It will be noted in particular that the maximum bias voltages for the tuner and IF do not coincide. Most conventional, reverse AGC systems operate on the low bias portions of the curves below the maximum gain points. Forward AGC systems, such as that of the invention, operate on the high bias portions of the curves below the maximum gain points.

In FIG. 3, there is plot of developed AGC voltage vs. antenna input signal level for a transistorized television receiver constructed in accordance with the invention. The plot is idealized and, in actual practice, would be much more rounded. Two shaded areas will be noted, one of which is labeled "tuner noise area," and the other of which is labeled "mixer overload area." It is believed well known in the art to maintain tuner gain at maximum for as long as possible, since this technique generally gets one out of the tuner noise area at the lowest possible input signal level. The IF amplifier must also be maintained at maximum gain, at least for signals below the AGC threshold level. For signals above AGC threshold, the IF amplifier gain is reduced proportionately until it becomes desirable to rapidly reduce the tuner gain in order to avoid the mixer overload area. Since the AGC system is a closed loop system, gain reduction in either the tuner or IF amplifier affects the signal level presented to the AGC input. Consequently, if maximum tuner gain reduction is desired, it may be achieved by arbitrarily limiting the IF gain reduction. In the graph, this is indicated by the IF AGC curve attaining a near zero slope accompanied by a steeply rising slope for tuner AGC since the overall gain reduction criteria of the system are fixed. The dashed line portions of the graphs will be explained later.

In FIG. 4 there is shown a schematic diagram of the portions of the circuitry incorporating the invention which yield the curves described in FIG. 3. In particular, a video amplifier transistor 45, having a base 46, an emitter 47 and a collector 48, is connected to a source of B+ potential through a load resistor 41, and to ground through an emitter resistor 42. The junction of load resistor 41 and collector 48 is connected to a voltage divider network consisting of resistors 43 and 44. The junction of this voltage divider is direct-current connected to the base electrode 76 of an AGC keyer transistor 75. Another voltage divider consisting of a variable resistor 71 and a fixed resistor 72 is connected between B+ and ground. Emitter 77 of transistor 75 is connected to the junction of resistors 71 and 72 and collector 78 is connected through a diode 66 to a pulse voltage winding 65, which is generally part of a conventional high voltage output transformer. The function of these latter components will be described in detail later. The other terminal of winding 65 is connected through a resistor 84 to B+ and through an AGC capacitor 85 to ground.

The AGC transistor 80 has a base electrode 81 connected to the junction of resistor 84 and capacitor 85 through another resistor 86. Its emitter 82 is connected to ground through a small emitter resistor 87, and its collector 83 is connected to B+ through a pair of serially connected resistors 88 and 89, forming a divided load. A tuner AGC diode 90 connects collector 83 to the junction Z of a voltage divider consisting of a pair of resistors 91 and 92. This junction is in turn connected to the transistor RF amplifier (not shown) of the tuner over a lead labeled RF AGC. The junction X of resistors 88 and 89 is connected to an oppositely poled IF AGC diode 95, which in turn is connected to the junction Y of a voltage divider consisting of resistors 97 and 98. Junction Y is connected to the IF amplifier over a lead labeled IF AGC. Diode 95 is also paralleled with a resistor 96 for purposes to be explained later.

In operation, a detected video signal is presented at base 46 of transistor 45, and reflected in an amplified signal appearing across collector resistor 41. The polarity of the signal at base 46 is negative and, consequently, the polarity of the signal at collector 48 is positive. The signal at collector 48 is coupled to the voltage divider network connected to base 76 of the AGC keyer transistor 75, tending to drive it into heavier conduction for increasing signal levels. It will be noted, however, that transistor 75 has no potential present on its collector electrode except during "sync pulse time" when a positive voltage pulse is generated in winding 65. Diode 66 is utilized to block any negative potential from appearing on collector 78 between positive pulses which would tend to forward bias the base-collector junction. The conduction threshold voltage for transistor 75 is established by the connection of emitter 77 to the voltage divider network consisting of variable resistor 71 and re- between base 76 and emitter 77 is conditioned upon the magnitude of the signal from collector 48 of the video amplifier transistor and the threshold voltage across resistor 72. Adjustable resistor 71 is provided to allow this threshold voltage to be set in accordance with the operational characteristics of the receiver.

During conduction time of transistor 75, that is, when a positive voltage pulse appears in winding 65, a current flows through the collector-emitter junction, the magnitude of which is dependent upon the bias across the base-emitter junction. The path of the current is from winding 65, through diode 66, through the collector-emitter junction, through emitter resistor 72 and through capacitor 85. This current flow tends to drive the upper terminal of capacitor 85 in a negative direction to a degree dependent upon the magnitude of the current. Thus for strong signals, capacitor 85 experiences a large current, and its upper terminal has its normally positive potential reduced substantially. Capacitor 85 also provides the well-known filtering action for the AGC potential, and a substantially DC potential appears across its upper terminal, which potential is representative of the input television signal strength.

The AGC amplifier transistor has its base connected to the upper terminal of AGC capacitor 85. Assuming that no signal is present at the input of the television receiver, the base potential of transistor 80 will be near B+ and, consequently, transistor 80 will be heavily conductive. Under these conditions, a large emitter-collector current flow occurs therein and the potential of collector 83 is at some value close to ground. As the signal input through the television receiver increases, the potential at base 81 swings in a negative direction (becomes less positive), thus reducing the conduction level in transistor 80 and causing a rise in the potential of collector 83. Thus, conditions are right for developing a forward AGC voltage as a function of input signal strength to the television receiver.

In accordance with the teachings of the invention, a pair of voltage divider networks are utilized to develop the correct maximum gain bias potential for the tuner and limiting bias potential for the IF amplifier. Thus, junction Z develops a potential equivalent to the bias potential required by the tuner for maximum gain operation. Resistors 97 and 98 are selected to develop a gain reduction limit potential at junction Y to produce the solid line AGC voltage vs. signal input curves of FIG. 3.

More specifically, under very weak signal conditions transistor 80 is heavily conductive, and the potential at collector 83 is close to ground. The circuit elements are selected such that at the AGC threshold level the potential of collector 83 maintains junction X at the voltage required for maximum gain in the IF amplifier (less the voltage drop across diode 95). In other words, under weak or no signal conditions, the IF AGC voltage maintains the IF amplifier in its maximum gain condition.

Reference to the curves of FIG. 2 will show that the tuner maximum gain bias voltage is lower than the IF maximum gain bias voltage. Consequently, the values of resistors 91 and 92 are selected to provide a voltage at junction Z which is equal to that required by the tuner for maximum gain. Since, under weak signal conditions, the collector voltage of transistor 80 will be lower than the bias required by the tuner for maximum gain, isolation is provided by diode 90.

As the input signal level is increased, conduction in transistor 80 is decreased and the potential of collector 83 rises. The RF AGC potential is unaffected until collector 83 achieves a potential which exceeds the potential at junction Z by the voltage drop across diode 90. This has the effect of maintaining the tuner gain constant over a first range of input signal levels and is commonly referred to as delaying the tuner AGC. During this period, the IF AGC potential is increasing and, consequently, diminishing the gain of the IF amplifier. Resistors 97 and 98 are selected to produce a potential at junction Y determined by the maximum gain reduction desired in the IF amplifier. As long as junction X is at a lower potential than this selected potential, diode 95 is conductively biased and effectively clamps junction Y to the voltage existing at junction X. This latter voltage, of course, increases with increasing signal level so that the IF AGC potential increases accordingly to perform all of the gain reduction in the television receiver over this signal range.

As the signal level is increased still further, a point is reached where the potential at junction X is equal to the potential at junction Y (neglecting the drop across diode 95). Now the IF AGC potential is substantially fixed at the voltage of junction Y (neglecting resistor 96 for the moment), and no further gain reduction occurs in the IF amplifier. Meanwhile, the voltage at collector 83 continues to increase with increasing signal level and it soon exceeds the voltages at junction Z by more than the drop across diode 90. Consequently, the RF AGC potential begins to increase quite rapidly. Since the IF AGC potential is substantially constant now, all of the additional gain reduction must be performed in the tuner which is beneficial to avoid the mixer overload area shown in FIG. 3.

In actual practice, it was found desirable to allow the IF AGC potential to increase somewhat to perform an additional amount of gain reduction under strong signal conditions. This is accomplished by partially bypassing diode 95 with a resistor 96, which effectively lessens the degree of isolation between junction X and junction Y. The addition of this resistor has the effect of shifting the curves of FIG. 3 as shown by the dashed lines.

Figure 5:
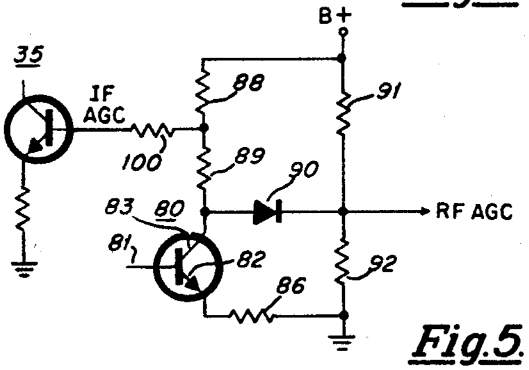
FIG. 5 is a modification of a portion of the circuit diagram of FIG. 4.

In FIG. 5 there is shown a modification of a portion of the circuit of FIG. 4, which produces similar limiting effects in the IF amplifier AGC potential without a separate diode. Portions of the circuit identical in character and function are indicated by similar reference numbers and needn't be described in detail. Effectively, diode 95 is replaced with a relatively large resistor 100. The IF AGC lead connects to the input circuit of an IF amplifier transistor 35 (partially shown) for exercising forward AGC control. It is well known that, in transistor circuits, the base-emitter impedance decreases rapidly under strong bias conditions. This characteristic is utilized in conjunction with resistor 100 to provide a limiting action for holding the IF AGC potential relatively constant under strong signal conditions. Under weak signal conditions, operation is similar to that previously described. While the circuit of FIG. 5 does not perform as well as that of FIG. 4, it does produce acceptable IF AGC action and, in situations where economy is the prime consideration, may prove of value.

What has been described is a novel automatic gain control circuit for use with transistorized television receivers. It is recognized that numerous modifications and changes in the described embodiments of the invention will be readily apparent to those skilled in the art, and it is intended that all such changes and modifications shall be interpreted within the spirit and scope of the invention as defined in the claims.

The embodiments of the invention in which an exclusive property or privilege is claimed are defined as follows:

1. An automatic gain control system for a television receiver including an RF amplifier and an IF amplifier exhibiting maximum gain characteristics at different bias points; a transistorized gain control stage having first and second output circuits respectively connected to said RF amplifier and said IF amplifier; first output circuit means maintaining the RF AGC potential at the maximum gain bias point of the RF amplifier for a first distinct range of increasing input signal levels; and second output circuit means limiting the IF AGC potential over a second distinct range of increasing input signal levels.

2. An automatic gain control as set forth in claim 1 wherein said RF amplifier includes a mixer stage subject to overload above predetermined input signal levels; said first output circuit means maintaining the RF AGC potential at its maximum gain bias point independent of input signal level for signal levels below said predetermined level and rendering said RF AGC potential responsive to input signal levels above said predetermined level, thereby avoiding mixer overload.

3. In an automatic gain control circuit for a transistorized television receiver having a tuner including a mixer stage subject to overloading at a predetermined input signal level and an IF amplifier, said tuner and said IF amplifier requiring different bias potentials for maximum gain; a transistor developing potentials responsive to the signal level in said television receiver; means coupling said transistor to said tuner and to said IF amplifier; first means in circuit with said transistor maintaining the tuner bias potential at its maximum gain value until the input signal magnitude approaches said predetermined level; and second means in circuit with said transistor supply bias potential to said IF amplifier for maintaining the gain of said IF amplifier substantially constant for input signal magnitudes above said predetermined level.

4. An automatic gain control system for a television receiver including a tuner having a mixer stage subject to overload at a predetermined input signal level, and an IF amplifier; a gain control transistor coupled to the output of the IF amplifier and having first and second output circuits coupled, respectively, to said tuner and said IF amplifier for developing gain reducing bias potentials as a function of the signal level in said television receiver; first diode means in said first output circuit and second diode means in said second output; said first diode means isolating said bias potentials from said tuner over a first range of increasing input signal level; said second diode means isolating said bias potentials from said IF amplifier over a second range of increasing input signal level.

5. A gain control system as set forth in claim 4; said first and said second diode means respectively including first and second diodes and first and second voltage divider networks; a load resistance in the output circuit of said gain control transistor, said first diode connected between a first point on said load resistance and said first voltage divider and said second diode connected between a second point in said output circuit and said second voltage divider.

6. A gain control system as set forth in claim 5, said diodes being oppositely poled whereby said first diode isolates the potential at said first point from the potential at said first divider network and said second diode clamps the potential on said second voltage divider network to the potential at said second point, the isolation and clamping action of said respective diodes occurring at least partially over said first range of signal level.

7. A gain control system as set worth in claim 6 wherein further said first diode clamps the voltage at said first voltage divider network to the potential at said first point and said second diode isolates the voltage at said second voltage divider network from the voltage at said second point, said clamping and isolation occurring at least partially over said second range of signal level.

8. A gain control system as set forth in claim 7 wherein said second diode is paralleled by a resistor for reducing the degree of isolation between said second point and said second voltage divider network over said second range of signal level.

References Cited

UNITED STATES PATENTS

| | | | |
|---|---|---|---|
| 2,834,877 | 5/1958 | Milwitt | 325—405 |
| 3,115,547 | 12/1963 | Tschannen | 325—411 |
| 3,084,216 | 4/1963 | Tschannen | 325—405 |
| 3,205,444 | 9/1965 | Birkenes | 325—404 |
| 3,344,355 | 9/1967 | Massman | 325—405 |

ROBERT L. GRIFFIN, *Primary Examiner.*

ALFRED H. EDDLEMAN, *Assistant Examiner.*

U.S. Cl. X.R.

325—404, 405